United States Patent
Stingl et al.

[11] Patent Number: 5,966,390
[45] Date of Patent: Oct. 12, 1999

[54] PASSIVELY MODE-LOCKED SHORT PULSE LASER

[76] Inventors: Andreas Stingl; Christian Spielmann; Ferenc Krausz, all of 24 Kleinengersdorferstrasse, A-2100 Korneuburg, Austria

[21] Appl. No.: 08/902,768

[22] Filed: Jul. 30, 1997

[30] Foreign Application Priority Data

Nov. 29, 1996 [AT] Austria .............................. 703/96 +0 U

[51] Int. Cl.⁶ ...................................................... H01S 3/098
[52] U.S. Cl. .............................. 372/18; 372/21; 372/103
[58] Field of Search .................................. 372/18, 19, 21, 372/103

[56] References Cited

U.S. PATENT DOCUMENTS

| | | | |
|---|---|---|---|
| 3,980,397 | 9/1976 | Judd et al. | 372/103 |
| 4,910,739 | 3/1990 | Sheng | 372/103 |
| 5,079,772 | 1/1992 | Negus et al. | 372/18 |
| 5,097,471 | 3/1992 | Negus et al. | 372/18 |

FOREIGN PATENT DOCUMENTS

| | | |
|---|---|---|
| 248141 | 7/1966 | Austria . |
| 34870 | 4/1886 | Germany . |
| 269464 | 6/1989 | Germany . |

OTHER PUBLICATIONS

L. Xu, et al., "Ultrabroadband Ring Oscillator for Sub–10–fs Pulse Generation", Optics Letters, vol. 21, No. 16, Aug. 15, 1996, pp. 1–4.

A. Stingl, et al., "Generation of 11–fs Pulses From A Ti:Sapphire Laser Without the Use of Prisms", Optics Letters, Feb. 1, 1994, vol. 19, No. 3, pp. 204–206.

D.E. Spence, et al., "60–fsec Pulse Generation From A Self–Mode–Locked Ti:Sapphire Laser", Optics Letters, vol. 16, No. 1, Jan. 1, 1991, pp. 42–44.

*Primary Examiner*—Hemang Sanghavi
*Attorney, Agent, or Firm*—Ostrolenk, Faber, Gerb & Soffen, LLP

[57] ABSTRACT

In a passively mode-locked short pulse laser arrangement including a laser resonator to which a pump beam is supplied, a titanium-sapphire (Ti:S) laser crystal, an optical Kerr element formed by the laser crystal itself, and an aperture restricting the resonator laser beam, the aperture has an arcuate or polygonal shape for adaptation to the beam cross-section.

9 Claims, 3 Drawing Sheets

PASSIVELY MODE-LOCKED SHORT PULSE LASER

TECHNICAL FIELD

The invention relates to a passively mode-locked short pulse laser arrangement comprising a laser resonator supplied with a pump beam, a laser crystal, in particular a titanium-sapphire-(Ti:S-)laser crystal, an optical Kerr element preferably formed by the laser crystal itself, and an aperture restricting the resonator laser beam.

BACKGROUND OF THE INVENTION

Such laser arrangements are used for scientific purposes, on the one hand, and can be used in material processing, on the other hand, particularly if fine structures are to be produced.

In the mode-locked state, a laser emits laser pulses instead of a continuous laser light (continuous wave (cw) operation), by storing energy and emitting it in pulse-like manner. The duration of the periods of these pulses will generally correspond to the round trip time of the pulses in the laser resonator, and, e.g., with a length of the linear resonator of 2 m, pulses with a frequency of approximately 75 MHz will be generated; at this, the laser light pulse passes the laser resonator in both directions, which in the instant example will correspond to a length of 4 m. For mode-locking, a loss is periodically introduced (with the resonator round trip frequency), so that the laser begins to pulse. This results in a peak power of the pulses that is substantially higher (amounting to 100 kW to 200 kW, e.g.) than the output power of the laser in cw operation (which is 150 mW to 300 mW, e.g.).

Basically, it can be differentiated between two types of mode-locking.

In active mode-locking, a periodic loss is introduced by means of an active element, a modulator, which is supplied with energy from the outside via a driver. Thus, the laser is forced to perform its laser activity in those time intervals in which there is a lower loss, whereas the laser can store energy in those time intervals in which there are high losses.

In passive mode-locking, the effect of an optical non-linearity in the resonator is utilized, i.e. an optically non-linear element is arranged in the path of the laser beam, and this non-linear element changes its optical properties, such as the transmission or reflectivity, proportionally to the intensity of the laser beam. As such a non-linear element or Kerr element, the laser crystal itself may, e.g., be used which, in combination with a linear loss element, forms a so-called saturatable absorber in which the total loss will become the lower the higher the intensity of the impacting laser light. By a fluctuation in the laser power, a pulse is generated which "sees" a substantially lower loss than does the laser in cw operation (cf. U.S. Pat. No. 5,079,772 A). The laser body (solid laser) consists of a non-linear material whose optical "thickness" varies with the field intensity distribution of the laser radiation. The non-linear index of refraction, e.g., is a function of the square of the field intensity, i.e. the laser beam whose spatial field intensity distribution may be considered to be like a Gaussian curve, effectively "sees" an element with an optical thickness that varies over its cross-section in the case of a laser crystal having plane-parallel faces. In this manner, a focusing lens results from a plane-parallel non-linearity.

This optical Kerr effect may be utilized for mode-locking in two manner (so-called "Kerr-lens mode-locking"): In the case of the so-called "soft" aperture (cf. Spence et al., Optics Letters, Jan. 1st, 1991, Vol. 16, p. 42–44), the pump beam (in Ti:S lasers the energy is supplied by means of green laser, such as, e.g., argon laser) is very much focused in the laser crystal so that the resonator beam produced by the Ti-S laser (approximately 800 nm, infrared) may then take up the greatest part of the pump energy, i.e. experience the highest gain, if it has the smallest diameter. Thus, the higher the intensity or the field strength of the pulse, the more the laser pulse will be focused and the greater its gain at any passage through the laser crystal, whereby its intensity is increased again. This positive feedback leads to a stable mode-locking.

In the case of the so-called "hard" aperture (cf. e.g. U.S. Pat. No. 5,079,772 A and U.S. Pat. No. 5,097,471 A) the effect that an aperture restricts the resonator beam at a site where it has a larger diameter at that time when the intensity (field strength) is lower, and has a smaller diameter at that time when the intensity is higher and the resonator beam thus is focused in the laser crystal. The invention particularly relates to such a laser arrangement, i.e. one having a "hard" aperture.

SUMMARY OF THE INVENTION

The invention has as its object to provide a laser arrangement of the initially defined kind, in which a further increased output as well as an additional shortening of the laser pulses to pulse durations in the order of 10 fs and therebelow are enabled by simple means.

In the inventive laser arrangement of the initially defined kind the aperture has an opening with an at least partially arcuate or polygonal rim.

The invention is based on the finding that by appropriately adapting the aperture to the cross-section of the beam, an effective mode-locking can be achieved already at a lower linear loss of beam cross-sectional area as compared to conventional apertures which had straight-line slits as aperture. It has been shown that thus, an output increase of more than 10% can be achieved. Furthermore, by adapting the aperture to the beam cross-section, broadening of the mode-locked spectrum is enabled, and such a broadening in the spectral range can be used to produce even shorter laser pulses. Such a broadened spectrum of the initial laser beam is also advantageous if applications of broad spectra are desired, such as, e.g., for broadband telecommunication or in spectroscopy.

Depending on the cross-sectional shape of the laser beam, which can, e.g., be influenced by aid of the spherical mirrors or lenses provided in the resonator, it is suitable if the aperture has oppositely provided elliptical-arc-shaped rims or circular-arc-shaped rims. Thereby advantageous aperture adaptations for constricting the respective resonator beam are ensured.

For an optimum result with respect to the output increase and spectrum broadening it is furthermore advantageous if the aperture has two aperture parts adjustable relative to each other, which each have an arcuate or polygonal recess forming the aperture rim.

Contrary to an aperture having a simple, straight-line slit, where an aperture adjustment in the direction of the slit does not contribute anything, with the present laser arrangement fine adjustment of the aperture to the resonator beam in the sense of both a "horizontal" and of a "vertical" centering is suitable (wherein "horizontal" and "vertical" in this case are to be understood merely with respect to an e.g. horizontal direction of polarization of the laser light, yet not as limitation in scope). Quite generally, with the present laser arrangement it is thus advantageous for a fine adjustment if the aperture is adjustable in two directions perpendicular relative to each other.

Furthermore, in tests in connection with common laser means, in particular with beam diameters in cw operation of approximately 2 mm to 2.5 mm, it has proven suitable if the aperture has a—preferably adjustable—maximum width of from 1 mm to 3 mm in the direction of the polarization of the laser light.

Finally, for a particularly efficient constriction it is also advantageous if the aperture is arranged at a distance of from 1 cm or a few cm in front of the one end mirror of the laser resonator.

The invention will now be explained in more detail by way of exemplary embodiments illustrated in the drawing to which, however, it shall not be restricted.

DETAILED DESCRIPTION OF THE PREFERRED EMBODIMENTS

Figure 1:
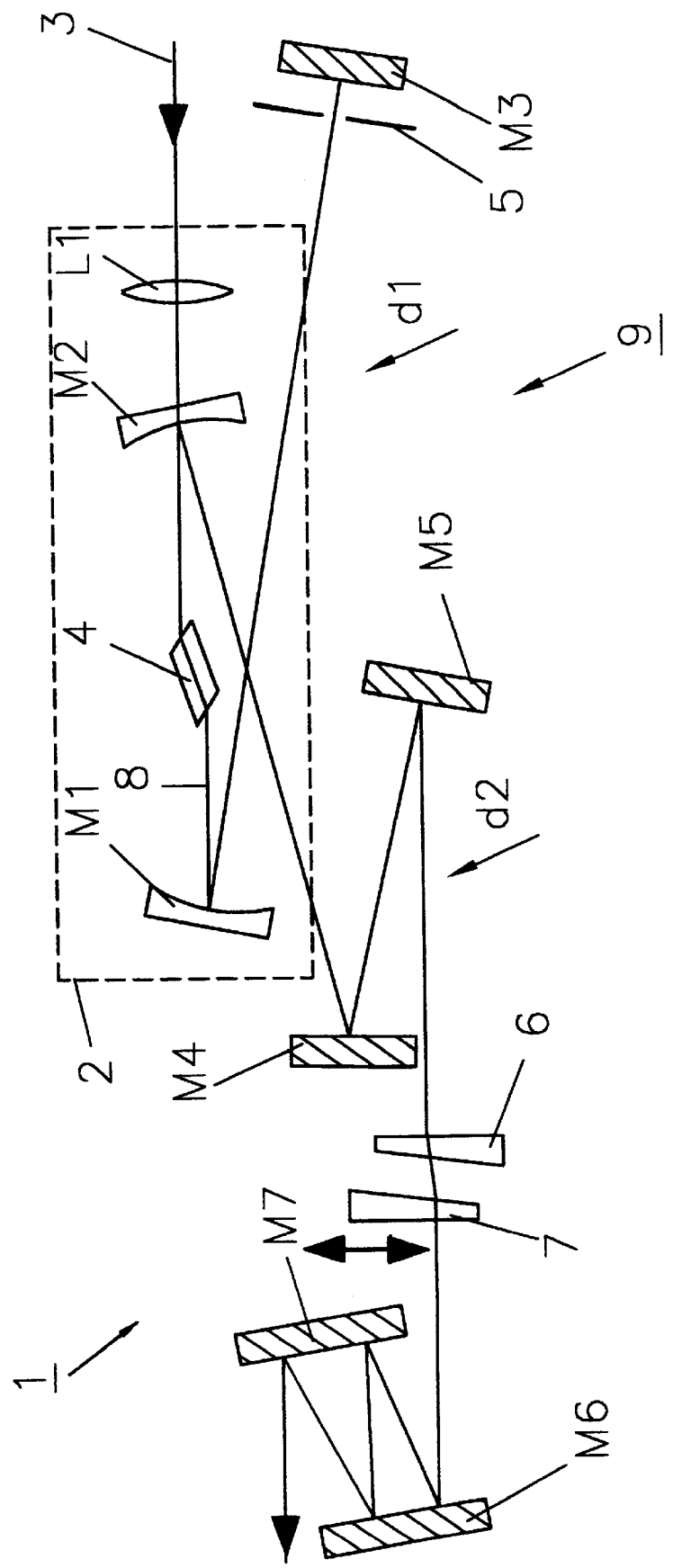
FIG. 1 is a schematical illustration of a short pulse laser arrangement, in top view.

In FIG. 1, a short-pulse laser arrangement 1 is schematically illustrated, in which the afore-mentioned "Kerr-lens mode-locking" principle is used for the short pulse generation and laser mirrors realized by thin film technique are used for dispersion control.

According to FIG. 1, the laser arrangement 1 comprises a laser head 2 indicated in broken lines, to which a pump beam 3, an argon laser beam, e.g., is supplied. For the sake of simplicity, the pump laser (argon laser, e.g.) itself has been omitted, this pump laser being part of the prior art.

After passing through a lense L1 and a semitransparent laser mirror M2, the laser beam passes through a laser crystal 4, a titanium:sapphire solid laser crystal in the present example, whereupon it impacts on a laser mirror M1 and is reflected by the latter to a laser mirror M3 outside of the laser head 2, by traversing an aperture 5 to be explained below in more detail. This laser mirror M3 reflects the laser beam back to the mirror M1 from where the laser beam is reflected back to the laser mirror M2, thereby passing the laser crystal 4 a second time. From there, the laser beam is then reflected via further laser mirrors M4, M5 and a semitransparent, wedge-shaped output coupler mirror 6, whereby the laser resonator is formed. Via the decoupling mirror 6, the laser beam is furthermore decoupled, a compensation platelet 7 as well as mirrors M6, M7 produced in thin film technique providing for a dispersion compensation. The wedge-shape of the decoupling mirror 6 ensures that no undesired reflexions will occur from its rear side towards the laser resonator.

The resonator beam obtained in the manner described in the laser head 2 is denoted by 8, and the laser resonator is denoted by 9; there, the—"folded" laser resonator 9 has a short resonator leg d1 (between the mirrors M1 and M3) and a long resonator leg d2 (between the mirrors M2 and 6).

The laser crystal 4 is a plane-parallel body (a parallelepiped) that is optically non-linear and forms a Kerr element that has a greater effective optical density for higher field strengths of the laser beam 8, whereas it has a smaller effective thickness when the field strength or intensity, respectively, of the laser beam 8 is low. This Kerr effect which is known per se is utilized for autofocusing of the laser beam 8, i.e. the laser crystal 4 forms a focusing lens for the laser beam (resonator beam) 8 with intensity-dependent focal distance.

Mirrors M1 to M7 are produced in thin-film technique, i.e. each of them is built up with many layers which exert their function at the reflexion of the ultra-short laser pulse having a wide band spectrum. The various wave length components of the laser beam penetrate into the layers or films of the respective mirror to various depths before they are reflected. Thereby, the various wave length components are delayed at the respective mirror for different periods of time; the short wave components are reflected more outwardly, while the long wave portions are reflected at a greater depth in the mirror. Thereby, the long wave components are delayed in time relative to the short wave components. In this manner, a dispersion compensation is obtained insofar as pulses which are particularly short in time (preferably in the range of 10 femtosecunds and therebelow) have a broad frequency spectrum; as a consequence, the various frequency components of the laser beam in the laser crystal 4 "see" different indices of refraction, i.e., the optical thickness of the laser crystal 4 is different for the various frequency components, and thus the various frequency components are differently delayed when passing through the laser crystal 4. This effect is counteracted by the afore-mentioned dispersion compensation at the thin film laser mirrors M1 to M7, cf. also Stingl et al., "Generation of 11-fs pulses from a Ti:sapphire laser without the use of prisms", Optics Letters, Feb. 1, 1994, Vol. 19, No. 3, pp. 204–206.

Also with a view to the slight retardations per reflection on a mirror M1 to M7, it is suitable or required to use a comparatively thin laser crystal 4, which, on the other hand, should have a high dotation for obtaining the desired effect, wherein, furthermore, the pump beam 3 and the resonator beam 8 are to be focused as much as possible.

Other forms of dispersion compensation are, of course, also possible, such as by aid of a prism pair or of a Gires-Tournois interferometer; these elements also introduce a difference in time delay between individual frequency components, yet they are based on other physical principles than the thin film laser mirrors; these principles are also known per se and thus need not be further explained here.

For mode-locking, the aperture 5 is used which restricts the resonator beam 8 at a site where it will have a larger diameter when the intensity or field strength of the fluctuating laser beam is lower, whereas, when the intensity of the laser beam 8 is higher because of the fluctuation, i.e., when the resonator beam 8 in the laser crystal 4 experiences an autofocusing, it will have a smaller diameter. This mode-locking mechanism can be made more clear by way of the schematic equivalent image according to FIG. 2 for the folded resonator 9 illustrated in FIG. 1.

As mentioned above, the mode-locking mechanism thus principally is based on the fact that the cross-section of the laser beam 8 (the mode) changes in the laser resonator 9. In the continuous wave operation (cw operation) of the laser, the mode has a large cross-section, and this larger cross-section is illustrated in broken lines 11 in FIGS. 2 and 3. In the pulsed operation, the laser beam 8 has a markedly smaller diameter which is illustrated in full lines 12 in FIGS. 2 and 3.

Figure 2:
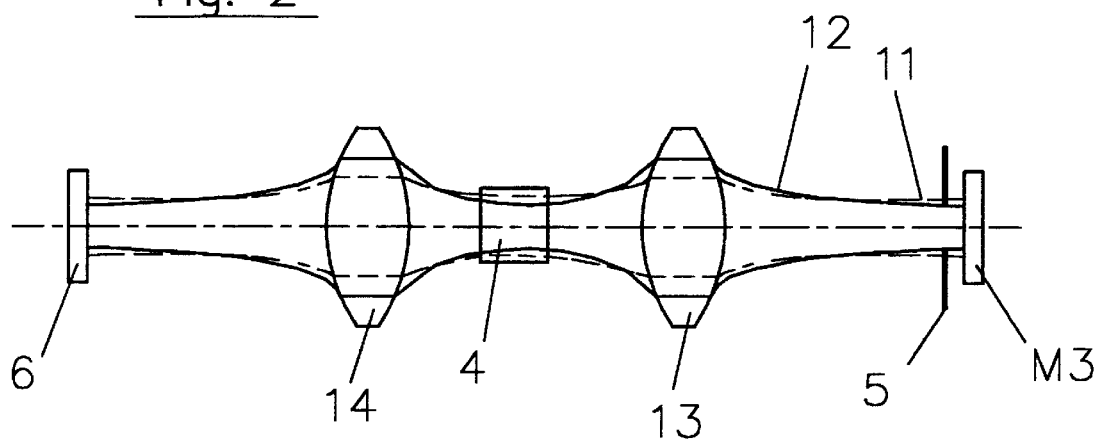
FIG. 2 is an equivalent image of this laser arrangement according to FIG. 1.

In the equivalent image of FIG. 2 for the folded resonator 9 according to FIG. 1, two spherical lenses 13, 14 replace the spherical focusing mirrors M1, M2 of FIG. 1, and the resonater 9 is closed by plane end mirrors, e.g. the mirrors 6 and M3 according to FIG. 1, one of these end mirrors, mirror 6, e.g., being designed as a decoupling mirror. Furthermore, in FIG. 2 also the laser crystal 4 utilized as Kerr element for mode-locking according to the so-called "Kerr-lens mode-locking" principle is schematically illustrated.

In front of the right-hand end mirror M3 in FIG. 2, there is the aperture 5 which aids the mode-locking mechanism according to the above-mentioned principle of the "hard" aperture. As can be seen particularly in FIG. 3, in addition to FIG. 2, this is effected in that the aperture 5 in cw operation introduces a larger loss than in the mode-locked, i.e. pulsed, operation, by relatively strongly restricting the larger cross-section 11 of the laser beam 8 in the cw operation and letting the smaller cross-section 12 of the laser beam 8 in the mode-locked operation pass more or less unimpededly. Thus, a stable mode-locked state is obtained.

The degree of mode-locking, i.e. the portion of the cw-background in relationship to the mode-locked laser output may be adjusted by a corresponding more or less pronounced constriction of the laser beam 8 by aid of the aperture 5. Normally, the aperture 5 should constrict the laser beam 8 just so much that no cw portion will be contained in the output signal of the laser.

Figure 3:
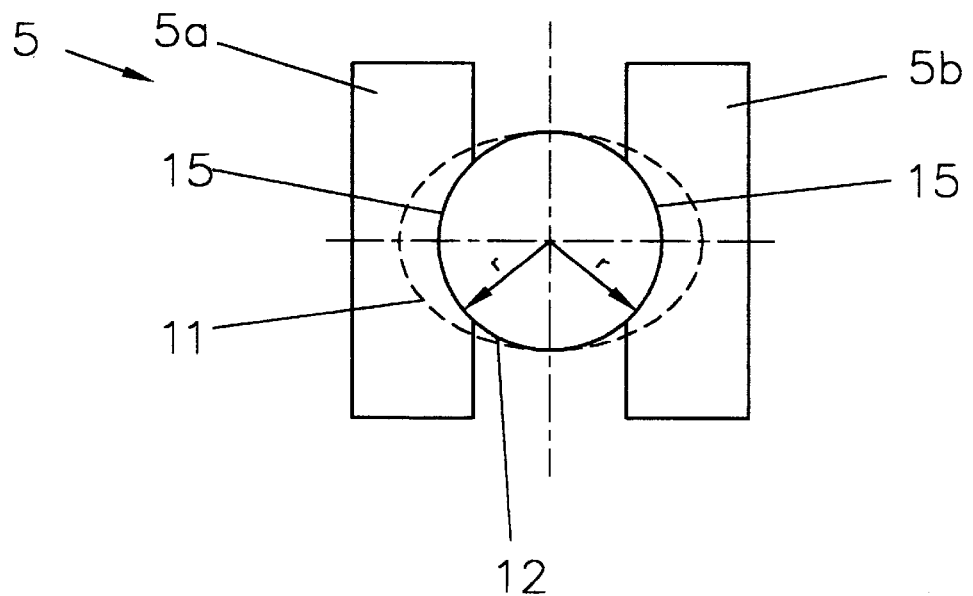
FIG. 3 is a view of the aperture provided in this laser arrangement.

The effect of constricting the resonator beam 8 is different in horizontal direction and in vertical direction, respectively, and this is a consequence of the polarization direction of the laser light. In case of a horizontal polarization of the light of the laser resonator 9, i.e. if the field vector extends horizontally, the aperture 5 will have the best effect if the laser beam 8 is constricted in the horizontal direction, as is illustrated in FIGS. 1 to 3. This orientation will be referred to by way of example in the following, yet this orientation of the aperture (an upright aperture here, cf. FIG. 3 which shows a view in the aperture region, whereas FIGS. 1 and 2 are schematic top views on the laser arrangement) need not always be given; of course, with a different laser light polarization direction, the orientation of the aperture 5 should be changed accordingly so as to obtain the optimum aperture effect.

In earlier laser arrangements, a simple slit aperture has been used which had two straight-line, parallel slit rims. This linear restriction by the aperture edges, by which lateral segments of the resonator beam in cross-section (in cw operation) were cut off, resulted in various detrimental effects, particularly that of an insufficient utilization of the power.

Figure 4:
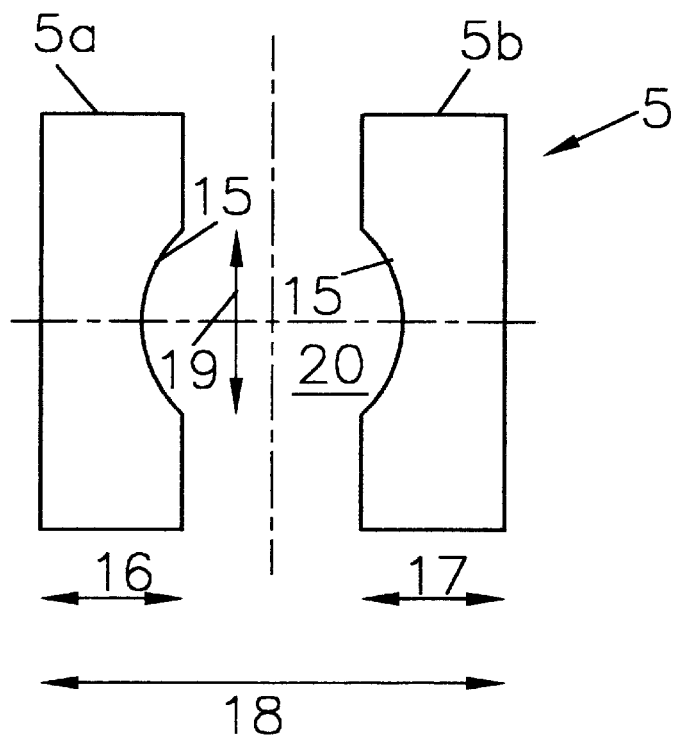
FIG. 4 is a schematical view of the modes of adjustment possible with this aperture, the aperture being adjusted to its greatest width.

In the present laser arrangement, the resonator beam 8 which is round to elliptical in cross-section, is now constricted by an adapted aperture 5. The plane-parallel edges of the previous apertures are replaced by arcuate, in particular circular-arc-shaped edges or rims 15, cf. FIG. 3. The aperture 5 itself consists, e.g., of two aperture parts 5a, 5b adjustable relative to each other in horizontal direction (or generally parallel to the direction of polarization of the laser light), at least one of the aperture parts 5a, 5b being horizontally displaceable, preferably, as shown by the double-arrows 16, 17 in FIG. 4, both aperture parts 5a, 5b horizontally and independently of each other. In FIG. 4, an adjustment of the aperture 5 with maximum width is illustrated.

For horizontal centering of the aperture 5, furthermore a horizontal displacement of the entire aperture 5 according to arrow 18 in FIG. 4 is provided for, and for a vertical centering of the aperture relative to the laser beam 8, a vertical displacement of the entire aperture 5, according to arrow 19 in FIG. 4, is provided for. This vertical displacement of the aperture 5 (or generally at a right angle to the direction of polarization of the laser light) is suitable in the present laser arrangement—other than in the conventional apertures with a vertical slit—since the rims 15 of the opening 20 of the aperture 5 are arcuate, e.g. elliptical-arc-shaped or, in particular, circular-arc-shaped, so that also in this vertical direction a fine adjustment to the laser beam 8 is suitable to be able to fully utilize the effects obtainable on account of the arcuate rims 15 when constricting the laser beam 8.

For adjusting the aperture 5 or the aperture parts 5a, 5b according to the arrows 16 to 19, conventional mechanisms, such as in particular spindle drives or micrometer screw gears including the respective guides and bearings, may be provided. Since this is a per se conventional technology, a detailed description of these adjusting mechanisms is not required.

The shape of the cross-section of the resonator beam 8 can be influenced by aid of the mirrors M1, M2 according to FIG. 1 by their angular position, and, as is preferred in the present laser arrangement, in cw operation, e.g., an elliptical cross-section can be adjusted in the region of the aperture 5 (cf. the cross-sectional line 11 in FIG. 3); in that case, the main axis of the ellipse extends horizontally or generally in parallel to the polarization vector of the laser light. If, as has been further illustrated in FIG. 3, the aperture parts 5a, 5b are adjusted such relative to each other that the rims 15 of the opening define circular arcs, e.g. lie on one and the same circle, a circular cross-section of the laser can be obtained with the constriction, as has been illustrated by the full line 12 in FIG. 3. Quite generally, the arc-shape or the radius of curvature r (FIG. 3) of the rims 15 should be adapted to the beam diameter so as to obtain as good results as possible with respect to increasing the output as well as to broadening the mode-locked spectrum. In tests it has been found that for a laser resonator having a length of approximately 2 m and focusing mirrors M1, M2 having a radius of −50 mm, the beam diameter at the site of the aperture 5, in the vicinity of the end mirror M3 of the shorter resonator leg (d1 in FIG. 1), in cw operation is approximately 2 mm to 2.5 mm, and that the beam diameter in mode-locked operation is reduced to approximately 1 mm to 1.5 mm. With such a dimensioning of the laser, optimum results will be obtained if the rims 15 are defined to be circular-arc-shaped having a radius r of approximately 1.5 mm.

Furthermore, it proved to be suitable if the aperture 5 is arranged at a relatively short distance in front of the end mirror M3 of the short resonator leg d1, i.e. at a distance of approximately 1 cm or of only a few cm, 1 cm to 8 cm, e.g., depending on the length of the resonator leg. As a guideline, it has been found that the distance of the aperture 5 from the end mirror M3 may amount to approximately 2% to 5% of the length of the short resonator leg d1 (which is approximately 80 cm, e.g.).

Tests have shown that with an aperture 5 of such configuration, broadening of the spectrum by approximately 15% may be obtained. Such a broadening in the frequency range means that correspondingly even shorter pulses may be obtained in the time range. Furthermore, a broad output spectrum of the laser arrangement can be better utilized for all applications of broad spectra.

Furthermore, it has been found that the output of the mode-locked laser beam could be increased by adapting the aperture 5. The efficient mode-locking apparently is obtained even at a slighter loss of beam cross-sectional area, as compared to the conventional straight slit apertures. The output increases achieved in the tests were more than 10%, and it has been possible, e.g., to achieve average outputs of more than 500 mW and more (instead of previously 450 mW). The peak output which will be the higher the shorter the pulses, could be increased to more than 400 kW at pulse durations of 10 fs, at 75 MHz pulse repetition frequency, with increases to up to 1 MW (1 Megawatt) seeming feasible.

Figure 5:
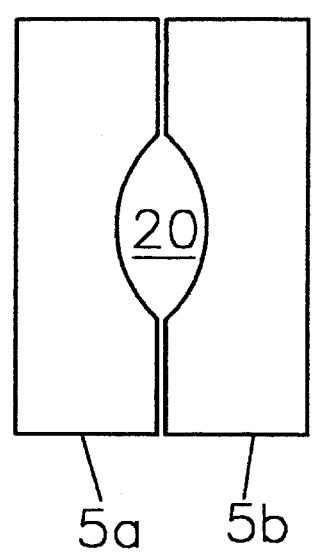
FIG. 5 is a schematical illustration of another extreme aperture adjustment, i.e. with minimum aperture.

In FIG. 5, the narrowest aperture adjustment as compared to FIG. 4 is shown. FIGS. 4 and 5 show two extreme aperture adjustments for the purpose of illustrating possible aperture adjustments, by displacing the aperture parts 5a, 5b relative to each other, FIG. 4, e.g., showing a circular aperture opening (having a diameter of 3 mm in the instant numerical example), and FIG. 5 showing an aperture narrowed to ⅓ (having a maximum width of 1 mm in the numerical example mentioned).

Figure 6:
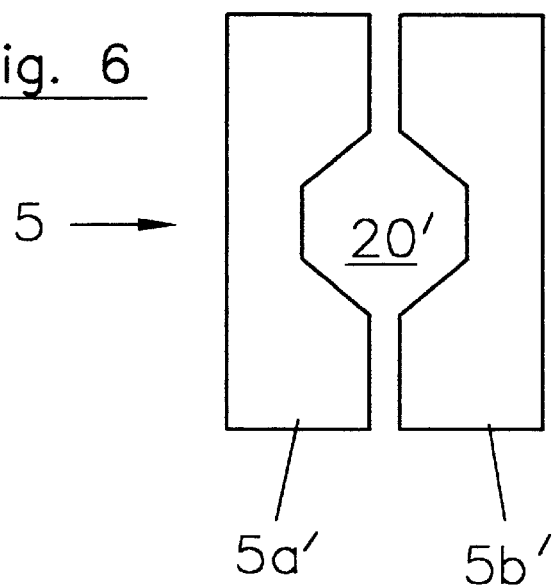
FIG. 6 is a view of a modified aperture having a polygonal opening.

As illustrated in FIG. 6, if a simple production is preferred to an ideal adaptation, the aperture 5 may also be configured with a polygonal opening 20, the aperture parts 5a', 5b' having corresponding polygonal edges or opening rims; here, too, an adaptation to the beam cross-section can be obtained, although this will not be quite as effective as in the case of a circular or elliptical aperture.

What is claimed is:

1. A passively mode-locked short pulse laser arrangement comprising a laser resonator supplied with a pump beam and causing a resonator laser beam, a laser crystal including an optical Kerr element and an aperture restricting said resonator laser beam, said aperture having an opening with an at least partially arcuate or polygonal rim, and further wherein said aperture comprises two aperture parts adjustable relative to each other, each of said aperture parts having an arcuate or polygonal recess forming said rim, said aperture being adjustable to minimize losses, to achieve an effective mode locking and to broaden spectral range.

2. A short pulse laser arrangement as set forth in claim 1, wherein said laser crystal is a titanium-sapphire (Ti:S) laser crystal.

3. A short pulse laser arrangement as set forth in claim 1, wherein said optical Kerr element is formed by said laser crystal itself.

4. A short pulse laser arrangement as set forth in claim 1, wherein said aperture has an opening with oppositely arranged elliptical arc-shaped rims.

5. A short pulse laser arrangement as set forth in claim 1, wherein said aperture has an opening with oppositely arranged circular arc-shaped rims.

6. A short pulse laser arrangement as set forth in claim 1, wherein said aperture is associated with means for adjusting said aperture in two directions perpendicular relative to each other.

7. A short pulse laser arrangement as set forth in claim 1, wherein said aperture has a maximum width of from 1 mm to 3 mm in the direction of polarization of the laser beam.

8. A short pulse laser arrangement as set forth in claim 7, wherein said maximum width of said aperture is adjustable.

9. A short pulse laser arrangement as set forth in claim 1, wherein said laser resonator comprises two end mirrors and wherein furthermore said aperture is arranged at a distance of from 1 cm to only a few cm in front of one of said end mirrors of said laser resonator.

* * * * *